US009760914B2

(12) United States Patent
Chen-Ritzo et al.

(10) Patent No.: US 9,760,914 B2
(45) Date of Patent: Sep. 12, 2017

(54) DETERMINING COST AND PROCESSING OF SENSED DATA

(75) Inventors: Ching-Hua Chen-Ritzo, Mahopac, NY (US); David Alexander Epstein, Ossining, NY (US); Rick Allen Hamilton, II, Charlottesville, VA (US); Perry G. Hartswick, Millbrook, NY (US); Hongfei Li, Yorktown Heights, NY (US); Clifford Alan Pickover, Yorktown Heights, NY (US); Ralph Peter Williams, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 12/551,200

(22) Filed: Aug. 31, 2009

(65) Prior Publication Data

US 2011/0055087 A1    Mar. 3, 2011

(51) Int. Cl.
 *H04B 17/382* (2015.01)
 *G06Q 30/02* (2012.01)
 *G06Q 30/06* (2012.01)
 *G06Q 50/18* (2012.01)

(52) U.S. Cl.
 CPC ......... *G06Q 30/0283* (2013.01); *G06Q 30/06* (2013.01); *G06Q 50/188* (2013.01)

(58) Field of Classification Search
 USPC .......................................................... 705/1.1
 See application file for complete search history.

(56) References Cited

U.S. PATENT DOCUMENTS

| | | | |
|---|---|---|---|
| 6,591,166 B1 | 7/2003 | Millett et al. | |
| 6,845,336 B2 | 1/2005 | Kodukula et al. | |
| 7,391,333 B2 | 6/2008 | Madden et al. | |
| 7,720,615 B2 * | 5/2010 | Kim | 702/25 |
| 8,687,533 B2 * | 4/2014 | Wolfe | H04W 52/0264 370/311 |

(Continued)

FOREIGN PATENT DOCUMENTS

| | | |
|---|---|---|
| WO | 2007/079279 A2 | 7/2007 |
| WO | PCT/US10/30705 | 6/2010 |

OTHER PUBLICATIONS

Dictionary.com definition of aggregate.*

(Continued)

*Primary Examiner* — Jan P Mincarelli
(74) *Attorney, Agent, or Firm* — Vazken Alexanian; Ryan, Mason & Lewis, LLP

(57) ABSTRACT

Methods, systems and apparatus for determining a proposed cost for use of sensor resources and selecting a method of processing of sensed data are presented. Such a method includes the steps of: predicting a state of an environment, obtaining at least one criterion related to the use of the sensor resources comprising one or more data sensors, determining the proposed cost for use of the sensor resources, acquiring the sensed data from the one or more data sensors, determining a characteristic of the sensed data, and selecting the method of processing the sensed data according to the determined characteristic and the predicted state. The at least one criterion is based upon the predicted state. The determining of the proposed cost is based on the at least one criterion. One or more of steps are implemented on the processor device.

26 Claims, 6 Drawing Sheets

(56) References Cited

U.S. PATENT DOCUMENTS

| | | | |
|---|---|---|---|
| 2002/0031402 A1 | 3/2002 | French | |
| 2004/0095237 A1 | 5/2004 | Chen et al. | |
| 2005/0010465 A1* | 1/2005 | Drew et al. | 705/9 |
| 2007/0050157 A1* | 3/2007 | Kahn et al. | 702/55 |
| 2007/0230353 A1* | 10/2007 | Kashyap | H04L 67/12 370/238 |
| 2007/0239862 A1 | 10/2007 | Bronez et al. | |
| 2008/0040075 A1 | 2/2008 | Fillmann | |
| 2008/0040170 A1* | 2/2008 | Munro | G06Q 10/00 705/7.37 |
| 2008/0243439 A1 | 10/2008 | Runkle et al. | |
| 2008/0306985 A1* | 12/2008 | Murray et al. | 707/102 |
| 2009/0037570 A1 | 2/2009 | Yu et al. | |

OTHER PUBLICATIONS

A. Anandkumar et al., "Minimum Cost Data Aggregation with Localized Processing for Statistical Inference," IEEE INFOCOM Proceedings, Apr. 2008, pp. 1454-1462.

C. Tang et al., "Compression Techniques for Wireless Sensor Networks," in Wireless Sensor Networks, 2004, Chapter 10, , pp. 207-231, Springer.

C. Alippi et al., "Adaptive Sampling for Energy Conservation in Wireless Sensor Networks for Snow Monitoring Applications," IEEE International Conference on Mobile Adhoc and Sensor Systems, Oct. 2007, pp. 1-6.

L. Wang et al., "Predictive Modeling-Based Data Collection in Wireless Sensor Networks," 5th European Conference on Wireless Sensor Networks, Lecture Notes in Computer Science, Jan.-Feb. 2008, pp. 34-51, vol. 4913.

K. Mahinthakumar et al., "An Adaptive Cyberinfrastructure for Threat Management in Urban Water Distribution Systems," Lecture Notes in Computer Science, May 2006, 9 pages, vol. 3993, Springer.

J. Zhou et al., "Adaptive Sampling and Routing in a Floodplain Monitoring Sensor Network," 2nd IEEE International Conference on Wireless and Mobile Computing, Networking and Communications, Jun. 2006, pp. 85-93.

* cited by examiner

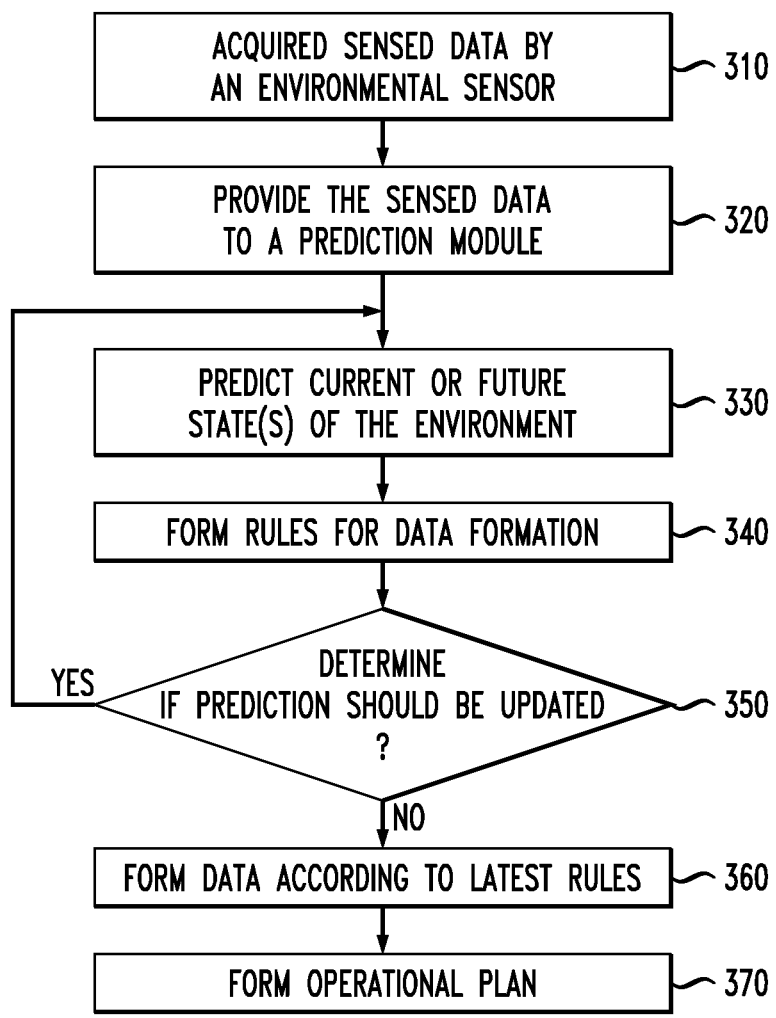

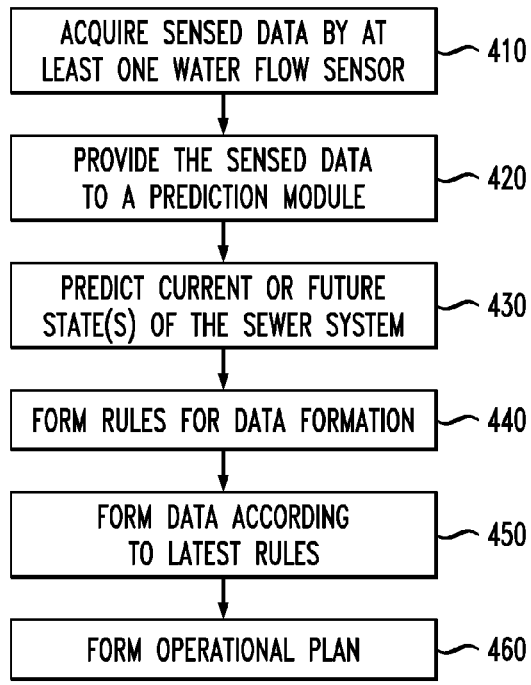
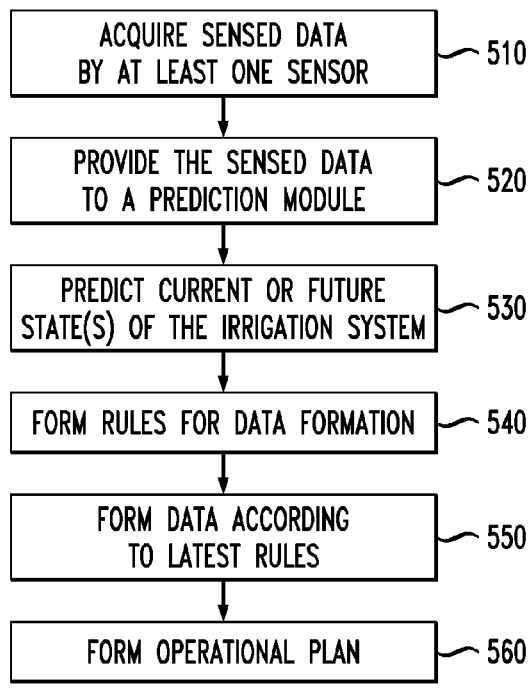

DETERMINING COST AND PROCESSING OF SENSED DATA

FIELD OF THE INVENTION

The present invention relates generally to acquiring and processing sensed data. More particularly, the invention relates to acquiring and processing sensed data by determining method of processing the sensed data with exemplary applications to water management.

BACKGROUND OF THE INVENTION

A physical quantity or attribute may be measured, or made known, by a sensor. The sensor measures or senses the quantity or attribute and converts the quantity or attribute into a signal (e.g., an electrical, hydraulic or pressure signal) which can be sent to and read by an observer, an instrument or a processing device. The quantity or attribute may be expressed as sensed data (i.e., data produced by a sensor before or after processing). Sensed data may represent, for example, physical aspects such as sensed light, motion, temperature, magnetic field, gravity, humidity, vibration, pressure, electrical field, sound, stretch and proprioception; environmental aspects, such as sensed toxins, nutrients and pheromones; metabolic indictors, such as sensed glucose levels, oxygen levels and osmolality; signaling molecules, such as sensed hormones, neurotransmitters and cytokines; and biological sensors known as biosensors. Some sensors are relatively simple and independently useful, for example, a home thermometer for directly reading temperature. Other sensors are more complex and used in conjunction with processing and data storage devices, for example, sensitive and complex image sensors onboard the Hubble telescope that are used in conjunction with spectrographs and image enhancing processors.

An exemplary system for sensing data may comprise a network of data sensors, a processor for enhancing, analyzing or formatting sensed data, and a storage device for storing the original sensed data or sensed data after processing. Systems for sensing data may be expensive to establish, use and maintain. Furthermore, access to systems for sensing data may not be readily available to those having use of such systems.

Water management has many different aspects. Water management, for example, may relate to public or private (e.g., local well) water supply systems, public or private (e.g., on-site septic) waste water systems, water resource management, floods, droughts, irrigation, and water quality.

Aspects of water management may be monitored by one or more water sensors that monitor parameters directly related to water, such as, water levels, water quality, water contamination, flow rates, turbidity, etc. Other sensors may also provide input for water management, but be less directly related to water, for example, weather sensors. Water sensors in one area or body of water may provide information needed for water management in another area or another body of water. Weather, can impact aspects of water management.

Sensor networks may be established to monitor parameters directly related to water and other parameters that may be related to water management in a less direct way. The establishment, maintenance and operation of such sensor networks may be expensive and not available to some potential users, for example small research groups.

SUMMARY OF THE INVENTION

Principles of the invention provide, for example, methods, systems and apparatus for determining a proposed cost for use of sensor resources and selecting a method of processing of sensed data.

For example, in accordance with one embodiment of the invention, a method of determining a proposed cost for use of sensor resources and selecting a method of processing of sensed data is presented. The method may be implemented on a processor device and includes predicting a state of an environment, and obtaining at least one criterion related to the use of the sensor resources. The sensor resources comprise one or more data sensors. The at least one criterion is based upon the predicted state. The method further includes determining the proposed cost for use of the sensor resources, acquiring the sensed data from the one or more data sensors, determining a characteristic of the sensed data, and selecting the method of processing the sensed data according to the determined characteristic and the predicted state. The determining of the proposed cost is based on the at least one criterion. One or more of predicting a state of an environment, obtaining at least one criterion, determining the proposed cost, acquiring the sensed data, determining a characteristic of the sensed data, and selecting the method of processing the sensed data are implemented on the processor device.

In accordance with another embodiment of the invention, a system for determining a proposed cost for use of sensor resources and selecting a method of processing of sensed data is provided. The system comprises modules for implementing the above method for determining a proposed cost for use of sensor resources and selecting a method of processing of sensed data.

In accordance with yet another embodiment of the invention, apparatus for determining a proposed cost for use of sensor resources and selecting a method of processing of sensed data is provided. The apparatus includes a memory and a processor coupled to the memory. The apparatus is operative to perform the above method for determining a proposed cost for use of sensor resources and selecting a method of processing of sensed data.

In accordance with one more embodiment of the invention, a computer program product for determining a proposed cost for use of sensor resources and selecting a method of processing of sensed data is provided. The computer program product comprises a computer readable storage medium having computer readable program code embodied therewith. The computer readable program code comprises computer readable program code configured to perform the above method for determining a proposed cost for use of sensor resources and selecting a method of processing of sensed data.

Principles of the invention provide, for example, optimizing the use of the constrained resources of sensor networks in the context of water management using an approach that is predictive in nature and capable of adapting to new data.

BRIEF DESCRIPTION OF THE DRAWINGS

FIG. 3 shows a flow diagram of an adaptive method for processing sensed data for water management, according to an embodiment of the present invention.

FIG. 4 illustrates a flow diagram of a method for processing sensed data for water management of a sewer system, according to an additional exemplary embodiment of the invention.

FIG. 5 illustrates a flow diagram of a method for processing sensed data for water management of agricultural irrigation, according to an additional exemplary embodiment of the invention.

DETAILED DESCRIPTION OF THE INVENTION

Figure 1:
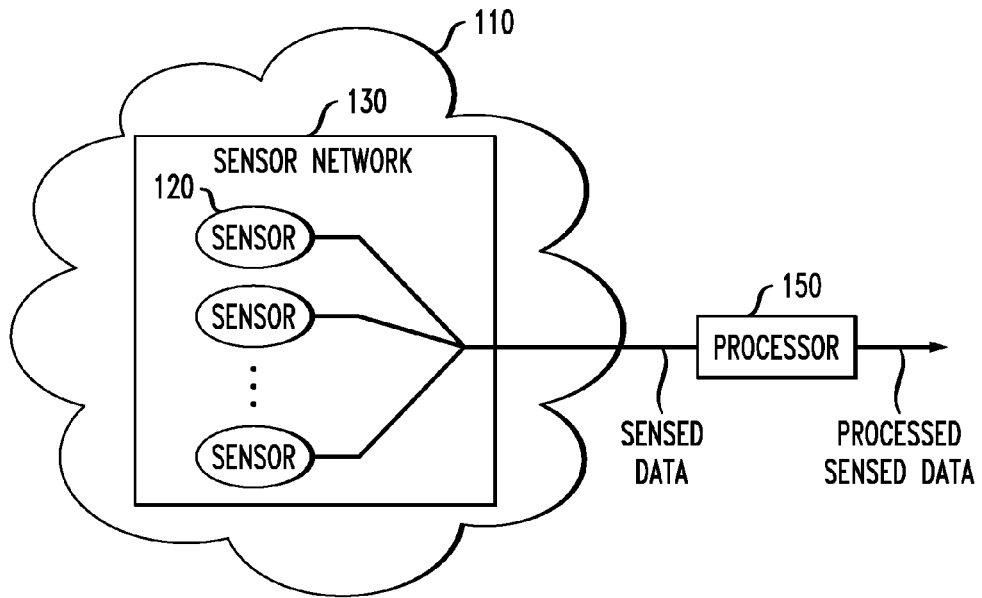
FIG. 1 illustrates a system for processing sensed data, according to an embodiment of the invention.

Exemplary embodiments of the present invention are described herein with reference to the field of water management to illustrate and provide a specific domain for application of the disclosed techniques. However, embodiments of the invention are applicable to other fields where sensed data is obtained.

Aggregation, as used herein, is the combining of data, for example, data from data sensors. For example, aggregation may comprise statistical aggregation of data, and processing of data.

A cost is an expenditure for, or value of, goods, services or use thereof and may include, for example, time, labor or money. As an example, a cost may be a value measured by what must be given, done or undergone to obtain the goods, services or use thereof. A cost may be or may include, for example, a price (e.g., a monetary price).

Data compression is the process of reducing (e.g., by encoding) the number of bits, or other information-bearing units, used to represent the data. The compressed data requires fewer bits, or other information-bearing units, to contain than the original data, or the decompressed data, requires. Therefore, transmission of compressed data requires the transmission of fewer bits, or other information-bearing units, than required for the original uncompressed data.

A lossy transmission of data is transmission of data that has undergone lossy data compression. Lossy data compression is data compression, wherein after decompressing the compressed data, the decompressed data is different from the original, but close enough to be useful. For example, lossy data compression provides for an approximation of the original data after reconstruction. Lossy data compression is used, for example, to compress: sensed data where the higher accuracy of lossless data compression is not required; multimedia data; data (e.g., relatively large volumes of data) wherein the amount of data or the accuracy of data is not required for an application; and data for applications that are, to some degree, fault-tolerant. There may be different degrees of which lossy data matches the data reconstructed from the lossy data. For example, some lossy data compression producing compressed data that, when uncompressed, more closely approximates the original data than provided by other more-lossy data compression.

A lossless transmission of data is transmission of data that has undergone lossless or no data compression. Lossless data compression is data compression that provides for substantially the exact original data to be reconstructed from the compressed data. Lossless data compression is used, for example, to compress sensed data where high accuracy is required, for data requiring compression but where high accuracy is needed, and for data for applications that are not fault-tolerant (e.g., financial transactions). Lossless compression may be used, for example, when it is important that the original and the decompressed data be identical, or when no assumption can be made on whether a certain deviation is not critical. Furthermore, lossless data compression may, for example, be a component of lossy data compression. It may be advantageous, for example, to make a master lossless file (e.g., an uncompressed file or a lossless compressed file) which can then be used to produce lossy compressed files for different purposes or applications.

Lossy data compression may have advantage over lossless data compression, for example, by providing smaller amounts of compressed data (e.g., data that is more compressed) than that provided by lossless data compression. Therefore, lossy data transmission has advantage over lossless data transmission, for example, by transmitting less data, by transmitting data that is more compressed, and by transmitting data in less time and/or with fewer resources. However, lossless data transmission has the advantage of providing data that more closely (i.e., exactly) resembles the original data.

Sensor networks may have constrained resources, for example, limited bandwidth, storage, or energy for receiving, storing, processing or transmitting data. When employing sensor networks, it may be important to optimize the use of the constrained sensor resources without compromising the quality of the data obtained, with respect to quality of the desired insights that the data is intended to inform.

Aspects of the invention address, for example, optimizing the use of the constrained resources of sensor networks in the context of water management. Examples of water management include flood/drought management, water distribution system management (e.g., irrigation, public water distribution), environmental management or monitoring of rivers, lakes and other bodies of water, other environmental management or monitoring, waste water management and salt water management. The sensors may provide sensed data that indicates aspects of water management.

Approaches for processing and/or transmitting data utilizing limited sensor resources include: (i) statistical aggregation of received data, (ii) compression of received data (e.g., lossy or lossless data compression), (iii) selective sampling or selective collection of data, and (iv) lossy or lossless transmission of data. The approaches for processing and/or transmitting data may, for example, be implemented in an adaptive manner and may therefore be considered examples of adaptive approaches, so that, relevant parameters are responsive, or adaptive, to new information about the environment. Alternately, any of these approaches for processing and/or transmitting data may be implemented in other than adaptive ways (e.g., non-adaptive ways).

The approaches for processing and/or transmitting data may, for example, be associated with (e.g., include, influenced or guided by) predictive methods or models (e.g., by predictions or estimations), so that the decisions regarding data processing and/or transmission may take into consideration one or more estimations or predictions of un-monitored parameters (although the estimations may consider monitored data), or may make a prediction, estimation or projection of a future or current state of the environment, for example, based on historical and/or current information or based on simulations. Therefore, the approaches for processing and/or transmitting data may be considered predictive or examples of predictive approaches. Approaches for water management may include, for example, adaptive and/or predictive data sampling and/or the aggregation of sensor data. Aspects of the invention may include, for example, data sampling, data compression, data transmission, adaptive approaches and/or predictive approaches in water management applications. Predictive models and methods may include, for example, simulation models and methods, statistical models and methods or other mathematical models and methods.

One embodiment of the invention provides automatic triggering of sensor modes (e.g., a lossy sensor mode or a lossless sensor mode (e.g., a lossy data compression mode or a lossless data compression mode, and a lossy sensor transmission mode or a lossless sensor transmission mode). Sensor transmission relates to transmission and methods of transmission of original or processed sensed data from one or more sensors. In this embodiment, sensor transmission and/or data processing characteristics in water management are automatically triggered and used according to the nature of data detected and other variables. In one embodiment, the variation in, and automatic triggering of, transmission/processing characteristics is based upon sensor reading specifics or characteristics and predicted future or current states of the physical, social, and/or economic environment. For example, lossy data transmissions may be used under normal operating conditions, whereas lossless characteristics may be used under extraordinary conditions. Furthermore, the automatic triggering of lossy or lossless techniques may be according to time of day or other chronological measures, or in response to the lossy/lossless characteristics of peer or neighboring sensors.

In an embodiment of the invention, a water sensor begins to transmit sensor data, and a system checks to see if a "special" condition exists (e.g., a condition related to prevailing prices (e.g., water or energy prices), predicted weather, eutrophication level, or turbidity). The time of day or other chronological measures may be checked, as well as the lossy/lossless characteristics of peer/neighboring sensors. Based, at least in part, on one or more of these checks, an algorithm is used to determine whether lossy or lossless transmission characteristics of the water sensor are to be used.

One aspect of the automatic triggering of lossy/lossless sensor modes is automatic triggering based upon characteristics of neighboring sensors (e.g., the modes of neighboring sensors, for example the lossy/lossless transmission mode), The definition of "neighboring" may change from time to time or under different conditions.

Aspects of the invention further provide, for example, methods and systems for aggregating, sampling, compressing and/or transmitting sensor data in an adaptive and predictive fashion for water management applications.

Aspects of water management may include, for example, water levels, water volumes, water flow rates, water contamination and a measure thereof, chemical concentrations, a level of turbidity, eutrophication, and population of a living matter. Chemical concentrations may include, for example, concentrations of nitrogen, phosphorus or oxygen. Nitrogen and phosphorus may be, for example, chemical nutrients of an ecosystem. Living matter includes, for example, fish, animals, plant life, algae, bacteria and other organisms. Population is considered to include a population characterized by an absolute or approximate number, and a population characterized by a concentration, that is, a number per volume or area unit. Water contamination includes, for example, contamination by fecal coliform bacteria.

FIG. 1 illustrates a system for processing sensed data, according to an embodiment of the invention. The system senses data within an environment 110, for example, a body of water. The system comprises a sensor network 130 comprising a plurality of sensors 120. The sensors 120 sense aspects or characteristics of the environment, for example, water levels and water flow rates. The system further comprises processor 150. Processor 150 receives sensed data from sensor network 130, processes the sensed data and provides processed sensed data, for example, to a user or a device of a user. Processor 150 may, for example, comprise any of a data acquisition module, a characteristic determining module, a prediction module and a method determining module. The functions of the data acquisition module, the characteristic determining module, the prediction module and the method determining module are described herein. The processor may be coupled to a memory (not shown). The processor 150 may be located in the vicinity of the sensor network 120 or may be remote from the sensor network 120.

Other embodiments of the invention comprise a separate processor coupled to each sensor for local processing of the sensed data. In one embodiment, the local processed sensed data for each sensor is forwarded to a common processor for further processing.

An exemplary goal of methods of the invention (e.g., methods 200, 300, 400, 500 and 600) is to implement an operational plan in an optimal, or near optimal, fashion, wherein the operational plan utilizes or considers certain estimated, projected or predicted values (e.g., values related to a state of the environment). An exemplary goal of the operational plan and implementation of the operational plan is to maximize the attainment of one or more objectives, for example, objectives related to soil erosion, public safety, water quality, flood prevention and other aspects of water management.

Figure 2:
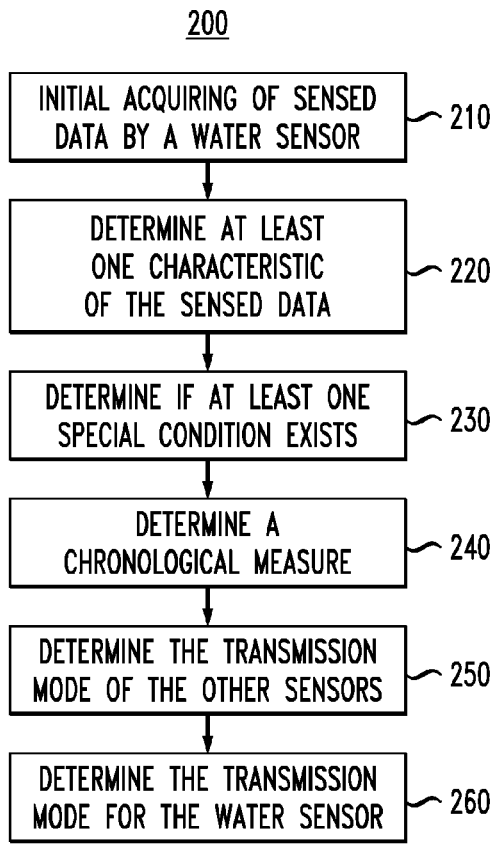
FIG. 2 shows a flow diagram of a method for processing sensed data for water management, according to an embodiment of the present invention.

FIG. 2 is a flow diagram of a method 200 for processing sensed data for water management, according to an exemplary embodiment of the invention. Steps of method 200, as well as methods presented in FIGS. 3-6, are shown in an exemplary order. The methods 200, 300, 400, 500 and 600 may comprise the steps in the shown order or in different orders. Each of the steps may occur one or more times. The methods 200, 300, 400, 500 and 600 may be, for example, implemented on a processor coupled to a memory.

The first step 210 is the initial acquiring, by a data acquisition module, of sensed data by or from a water sensor and the providing of the sensed data to a characteristic determining module, a condition determining module and a prediction module.

The second step 220 comprises determining, by the characteristic determining module, at least one characteristic of the sensed data. For example, characteristics of the sensed data may include weather conditions, an environmental condition, such as a dangerous environmental condition, a level of turbidity and eutrophication.

The third step 230 comprises determining, by the condition determining module and the prediction module, if at least one special condition does or does not exist. The at least one special condition may be determined to exist, or not to exist, according to the at least one characteristics of the sensed data. Alternately, the at least one special condition may be determined to exist, or not to exist, according to considerations of other than the sensed data, for example, predictions not based upon the sensed data. However, both sensed data and considerations other than sensed data may be considered. Special conditions include, but are not limited to, any of the following examples: prevailing or predicted water prices, prevailing or predicted energy prices, current or predicted weather, a prevailing or predicted dangerous environment, a predicted number of people that may be affected by an action (e.g., a water management operation or an act of nature), prevailing or predicted turbidity, and prevailing or predicted river eutrophication.

The at least one special condition, that is determined to exist or determined not to exist, comprises a predicted condition (i.e., a predicted state) that is predicted by a prediction module. A predicted state is a state (e.g., a state of an environment) where the special condition is predicted to exist or the state where the special condition is predicted to not exist. The predicted state may be a predicted currently existing state or a state predicted to currently not exist. Alternately, the predicted state may be a predicted future state that is predicted to exist or not exist at some future time. The predicted state may be predicted according to, at least in part, the at least one characteristics of the sensed data. Furthermore, the predicted state, optionally, may be predicted according to additional considerations of other than the sensed data, for example, predictions based upon data from other data sensors (e.g., that may be a different type of data sensor or in a different location), or based upon other non-data sensor related information (e.g., a known population or a map). The list of special conditions above indicate a number of predicted states that include one or more of: predicted water prices, predicted energy prices, predicted weather, a predicted dangerous environment, a predicted number of people that may be affected by an action, predicted turbidity, and predicted river eutrophication. Other examples of predicted states are: a predicted state of the environment (e.g., a economic, social or physical environment), a predicted state associated with water management, and a predicted cost for data sensor use.

Energy prices may affect the price of energy for transmission of data or for operations associated with the water management such as running water pumps, operating dams, and executing maintenance or operational actions. A dangerous environment may be, for example, a chemical or contaminant concentration exceeds a threshold. The predicted number of people that may be affected by an action may be, for example, people swimming in a river, or the number of children predicted to drink water from a particular water supply. An act of nature may be, for example, a flood, a drought or a weather storm. Eutrophication is an increase in chemical nutrients (e.g., compounds containing nitrogen or phosphorus in an ecosystem (e.g., a water ecosystem). Eutrophication may drive down oxygen concentration and lead to severe reductions in water quality, fish, and other animal populations.

The fourth step 240 is to determine a chronological measure, for example, the time of day or the time within another cyclic interval such as a week, month or year. The chronological measure is checked (i.e., determined) because a temporal history of sensor use, along with a prediction of water use, social behaviors, weather, contaminant level or other parameter, may indicate that it is advantageous for the sensor to provide a specific mode, e.g., lossy or lossless transmission. For example, during certain times of day an analysis of historical records may indicate past sensor usage that was or that required lossy or lossless transmission.

The fifth step 250 is to determine, by a method determining module, the transmission mode (i.e., lossy or lossless) of other sensors (i.e., one or more sensors that do not include the water sensor acquiring the sensed data). The system may check the lossy/lossless characteristics of peer or neighboring sensors. For example, if 20 peer sensors are lossy it may be advantageous for the water sensor to be lossless in order to improve accuracy.

The transmission mode is determined, for example, considering objectives of a user. Examples of user objectives are: (i) to minimize an error(s) associated with one or more statistical estimates based upon the sensed data, (ii) to minimize an error(s) associated with the use of the sensed data, (iii) to minimize the risk and/or cost of a false alarm (e.g., a false flood alert), and (iv) to minimize the risk and/or cost of a missed alarm.

The determining of the transmission mode, for example, may be done considering constraints, e.g., time constraints for transmission of data, bandwidth limitations for transmission of data, accuracy requirements or criterion of transmitted data, and accuracy requirements or criterion of statistical estimates resulting from the sensed data.

The sixth step 260 is to determine the transmission mode for the water sensor. The transmission mode is either lossy or lossless. The determining of the transmission mode is base on consideration of: (i) whether or not a special condition exists as determined in the second step 220, (ii) the chronological measure determined in the third step 230, and (iii) the transmission modes of the other sensors as determined in the fourth step 240. Consideration of the chronological measure and the transmission mode of the other sensors are optional. The determinations of sensor characteristics other than lossy or lossless transmission modes are contemplated. Sensor characteristic or modes, including, for example, transmission modes, data sampling modes, and modes data compression are considered methods of processing of sensed data.

In determining the transmission mode for the water sensor, an equation may represent the considered parameters. Each of the considered parameters may have a weight associated with it. By way of example only, the equation may be:

$$L=(W1 \times SC)+(W2 \times CM)+(W3 \times TM) \qquad (EQ.\ 1)$$

L is the resulting calculated parameter indicating which transmission mode to use. SC is a measure of the existence and, optionally, severity of one or more special conditions. SC may simply be either 0 or 1 dependent upon the existence or nonexistence of one or more special conditions, or SC may be a more complicated calculated composite parameter reflecting the number and/or importance of existing special conditions. CM is a parameter indicative of the chronological measure. Cm may simply be either 0 or 1 depending upon the chronological measure (e.g., the time being within a specific time period), or CM may be within a range of values be dependent upon the chronological measure (e.g., the specific time of day). TM is a parameter indicative of the transmission mode for the other sensors. For example, if there are 100 other sensors and 70 of the other sensors are in the lossy transmission mode, TM may have a value of 0.7 out of a possible range of values of 0 to 1. W1, W2 and W3 are weights to weigh SC, CM and TM, respectively, in the calculation of L. Additionally or alternatively, W1, W2 and W3 may be used to normalize SC, CM and TM, respectively. Possible values for W1, W2 ad W3 may, for example, range from 0 to 1, although they may have other values as well, including negative values. The calculate value of L may be compared against a threshold (T) to determine the transmission mode of the water sensor. By way of example only, if L is greater than the threshold T, the lossless transmission mode may be determined for the water sensor and if L is at or below the threshold T, the lossy transmission mode may be determined. An exemplary value of T is 0.6. Although EQ.1 is a linear equation, quadratic and other equations involving terms or parts of terms having exponents other than one (1) are contemplated.

As an overall example, consider one thousand (1000) sensors in a river comprising a first water sensor and 999 other sensors. The other sensors may or may not be water sensors. A determination for the first water sensor is to be made regarding the transmission mode (lossy or lossless) of the first water sensor. Because it is 3:00 pm, eighty (80) of the other sensors are in a lossless transmission mode, and because an eutrophication variable is above an eutrophication threshold, it is determined that the first water sensor enters a lossless transmission state. However, when the time reaches 5:00 pm, only forty (40) of the other sensors are transmitting in the lossless mode, and because the eutrophication variable is below the eutrophication threshold, it is determined that the first water sensor may enter the lossy transmission mode. An algorithm may be employed to make these determinations. The algorithm is represented by EQ. 2 below.

$$L=(CM \text{ OR } SC1 \text{ OR } TM) \text{ AND } SC2 \qquad (EQ. 2)$$

OR is the logical "or" function. AND is the logical "and" function. L, CM, SC1, TM and SC2 are all binary logic variables (e.g., having only values of 0 or 1). If L=0 the water sensor enters a lossy transmission state. If L=1, the water sensor enters a lossless transmission state. In this overall example, CM is a parameter indicative of the time of day. CM=1 if the time is between 1:00 pm and 4:50 pm; otherwise CM=0. TM reflects the number of other sensors having lossy transmissions in a neighborhood R. TM is therefore a function of neighborhood R, that is, TM(R). TM=1 if the number of sensors having lossy transmissions in the neighborhood R is above a transmitter threshold of for example, fifty (50); otherwise TM=0. SC1 is a parameter indicative of an eutrophication special condition. SC1=1 if the eutrophication level is above an eutrophication threshold; otherwise SC1=0. SC2 corresponds to a second special condition. Either or both SC1 and SC2 may be dependent upon a prediction of a state of an environment. SC2=1 if the second special condition exists or is predicted to exist and SC2=0 if the second special condition does not exist or is predicted to not exist.

In other examples, L may be a variable having a greater number of values within a range, for example, having 100 possible values between 0 and 1. In this case, L may specify a determined degree of lossless (i.e., a degree partway between totally lossless and totally lossy) for transmission of the first water sensor. For example, different levels of lossless correspond to different levels of data compression that may be employed. In this case one or more of the variables L, CM, SC1, TM and SC2 may also have more than two possible values within a range that correspond to degrees of what they represent.

The system may progressively scan other sensors within larger and larger neighborhoods R (i.e., larger and larger values of R, for example, area, dimensions or extent of the neighborhood R) to makes assessments of L as a function of the neighborhood R. Note that the value of R may be determined by many different criteria or models. For example, a simulation of river currents may suggest that R should include sensors that are primarily upstream and/or along some major water current.

The value of L may be visualized, for example, on a map of a river, within areas of a water management plant, or on a map of a region of land. A control panel may allow a user (e.g., water manager) to manually turn sensors to a lossy or lossless state in accordance with a value of L. A high-dimensional data set, stored in a database, may store L values as a function of time (e.g., last 30 days), SC, and TM. Similarly, a dashboard of L values may be presented to a user as a part of a system that allows a user to manually turn sensors to a lossy or lossless state.

The process of determining the value of L (e.g., degree of lossless) may be based upon assessment of risk (e.g., prediction of risk considered to be a prediction of a state of an environment). According to an embodiment of the invention, L is the result of a risk analysis. Such a risk analysis may include or predict potential lives affected, cost factors (including worst-case scenarios), and other parameters as special conditions. For example, decision makers who are responsible for the final water/energy costs may invest in a higher degree of lossless transmissions (larger L) if this will limit the variability of costs, even if the expected or average cost remains the same.

FIG. 3 is a flow diagram of an adaptive method 300 for processing sensed data for water management, according to another exemplary embodiment of the invention that relies on predictions and forecasts. The method may be iterated to periodically reform rules for the aggregation, sampling, compression and/or transmission of data.

The first step 310 of method 300 is to acquire sensed data by an environmental sensor. The sensed data may acquired by an acquisition module. The sensed data may be acquired considering a provisioning analysis according to methods of the invention, for example the provisioning analysis requested by a user in step 650 of method 600.

The second step 320 is to provide the sensed data to a prediction module.

The third step 330 is to predict or forecast at least one current or future state of the environment. The prediction module does the prediction or forecasting of the at least one current or future state. The prediction may, for example, be based upon the sensed data or a determined characteristic of the sensed data. By way of example only, the predicted current or future state in a first portion of the environment may be predicted based upon past or current conditions in a second portion of the environment as known by the sensed data.

The fourth step 340 is to form rules (e.g., create rules or update rules) for data formation. The formation of rules may include, for example, forming rules for any one or more of the following: acquiring data (e.g., sampling data), processing data (e.g., aggregation or compression of data), and transmission of data (e.g., lossy transmission and lossless transmission). The rules are formed by a rule formation module.

The rules may be formed, for example, according to the predicted current or future state of the environment, predicted in step 330, and/or according to the at least one characteristic of the sensed data determined in step 220 of method 200. The rules may be formed, for example, according to mathematical optimization, and may, for example, consider or be driven by objectives of a user. Examples of user objectives are: (i) to minimize the error(s) associated with one or more statistical estimates, (ii) to minimize an error(s) associated with the use of the sensed data, (iii) to minimize the risk and/or cost of a false alarm (e.g., a false flood alert), and (iv) to minimize the risk and/or cost of a missed alarm. The decision to generate an alarm may, for example, be dependent on the statistical estimate.

The rule formation module may be, for example, part of a method determining module. Determining a method of processing the sensed data is according to the rules for data formation.

The fifth step 350 is to determine, by the prediction update determination module, if the prediction should be updated, that is, repeating the third step 330. The prediction may be updated periodically, at specific times, when new data useful for prediction is available, or on demand by the user. For example, the prediction may be updated every hour so that current rules and/or sensed data will reflect an up to date prediction. If in the fifth step 350, it is determined that the prediction should be updated, the third step 330, and, optionally, other steps according to the flow chart of method 300, are executed. If it is determined in the fifth step 350 that the prediction should not be updated, the method 300 continues at the sixth step 360. The fifth step 350 provides for the method 300 to be adaptive to new sensed data. For example, repeating the predicting of current or future states of an environment provides for the determining of a method of processing to adapt the processing to new sensed data.

The sixth step 360 is to form data, by a data formation module, according to the latest rules formed in the fourth step 340. As mentioned above, the formation of data may include any one or more of the following: acquiring data (e.g., sampling data), processing data (e.g., aggregation or compression of data), and transmission of data (e.g., lossy transmission and lossless transmission).

The seventh step 370 is to form, by an operational plan formation module, an operational plan. The operational plan may be, for example, a business plan related to pricing and/or purchasing energy, a business plan related to procurement (e.g., pricing) of sensor use, a water management plan, a natural resource management plan, or an environmental management plan. The operational plan takes into consideration the sensed data. For example, the operational plan has the sensed data as input, or the operational plan comprises a plan for use of the sensed data. Alternatively, the operational plan may simply be to continue monitoring without any planned action.

FIG. 4 is a flow diagram of a method 400 for processing sensed data for water management of a sewer system during a weather storm event (e.g., rain, snow, or hail), according to an additional exemplary embodiment of the invention.

The first step 410 of method 400 is to acquire sensed data by one or more water flow sensors. The acquiring of the sensed data occurs during the storm event, for example the sensing of data starts at the approximate time that the storm event starts. An acquisition module acquires the sensed data.

The second step 420 is to provide the sensed data to a prediction module. The sensed data is provided by a sensed data providing module.

The third step 430 is to predict or forecast current or future flow conditions within the sewer system. The flow conditions may be, for example, locations with low flow due to blockages, locations with excessive inflow or infiltration, and locations that are under-utilized (e.g., can handle a greater flow than the existing flow). A prediction module does the prediction or forecasting of the current or future predicted flow conditions. The prediction may, for example, be based upon the sensed data. By way of example only, the predicted current or future flow in a first portion of the sewer system may be predicted based upon past or current flow conditions in a second portion of the sewer system as known by the sensed data.

The fourth step 440 is to form rules (e.g., create rules or update rules) for data formation. The formation of rules may include, for example, forming rules for any one or more of the following: acquiring data (e.g., sampling data), processing data (e.g., aggregation or compression of data), and transmission of data (e.g., lossy transmission and lossless transmission). The rules are formed by a rule formation module. For example, the rule formation module may be part of a method determining module. Determining a method of processing the sensed data is according to the rules for data formation.

The fifth step 450 to form data according to the rules formed in the fourth step 440. As mentioned above, the formation of data may include any one or more of the following: acquiring data (e.g., sampling data), processing data (e.g., aggregation or compression of data), and transmission of data (e.g., lossy transmission and lossless transmission). Data may be formed by a data formation module.

The sixth step 460 is to form, by an operation plan formation module, an operational plan. The operational plan may be, for example, a business plan related to pricing and/or purchasing energy, a business plan related to procurement (e.g., pricing) of sensor use, a sewer management plan, or a sewer environmental management plan. The operational plan takes into consideration the sensed data. For example, the operational plan has the sensed data as input, or the operational plan comprises a plan for use of the sensed data.

Although not explicitly shown, the method 400 may be iterated, in a manner similar to the iteration of the method 300, to update rules, the formation of data, and/or the operational plan.

FIG. 5 is a flow diagram of a method 500 for processing sensed data for water management of agricultural irrigation with respect to saline concentrations of irrigation water, according to an additional exemplary embodiment of the invention. If the saline concentration of water used for irrigation becomes too high, damage to crops may occur. Therefore, it is desirable to stop irrigation of crops if the saline concentration of irrigation water becomes too high, and to allow irrigation, possibly dependent upon additional conditions (e.g., weather forecast) when saline levels are low.

As a comparison of FIGS. 4 and 5 shows, the method 500 for water management of agricultural irrigation is similar to method 400 for water management of a sewer system; however, the application is different.

The first step 510 of method 500 is to acquire sensed data by one or more sensors. The sensors may be saline concentration sensors (e.g., placed outside of the irrigation system) or other sensors such as, for example, tidal condition sensors (e.g., tidal level or tidal volume sensors), weather related sensors, or water level sensors (e.g., water level sensors sensing water levels of a body of salt water). Sensed data is acquired by a data acquisition module.

The second step 520 is to provide, by a sensed data providing module, the sensed data to a prediction module.

The third step 530 is to predict or forecast current or future saline concentration conditions within the irrigation system. The prediction module does the prediction or forecasting of the current or future predicted saline concentration conditions. The prediction may, for example, be based upon the sensed data. By way of example only, the predicted current or future saline concentration in the irrigation system may be predicted based upon past or current tidal conditions, storm conditions, water levels of salt water in a body of water, and/or saline concentrations of water outside of the irrigation system as known by the sensed data. For example, the prediction module forecasts if saline level is normal (e.g., above or below a normal threshold) and advises local farmers (e.g., sugar cane growers) when water becomes or is predicted to become too saline to use for irrigation.

The fourth step 540 and the fifth step 550 are similar to the fourth step 440 and the fifth step 450 of method 400.

The sixth step 560 is to form, by an operational plan formation module, an operational plan. The operational plan may be, for example, a business plan related to pricing and/or purchasing energy, a business plan related to procurement (e.g., pricing) of sensor use, an irrigation management plan, or a saline water management plan.

Additional embodiments of the invention provide for automatically determining pricing for the sharing of sensor use by users who share one or more sensors, for example, a network of sensors. The sharing of sensors may entails differing patterns and methods of data capture and use, data processing and data reporting according to user needs. Payment and associated options may include use of sensors for a flat fee, or payment dependent upon use of the sensor, for example, the frequency of use, aspects of data capture, aspects of data processing, and aspects of data transmission. Furthermore, market principles such as bidding may be used in conjunction with the sensors, such that patterns and methods of data capture may be pushed to, or implemented on, the sensors according to a user. Optionally, the features of the invention may include a system for managing the process.

Users of sensor data are often interested in observing a multi-dimensional phenomenon that may spans a wide geographical area and/or heterogeneous environmental/social/infrastructural systems. Consequently, users of sensors may require multiple sensor types that may be in multiple environments or locations. However, sensor installations are commonly of a single sensor type, being owned and/or operated by a user requiring only information from that sensor type. Sensor installations commonly cover a single environment (e.g., geographical area) using a single sensor system.

As an example consider a user of multi-dimensional sensor data who is a scientist studying traffic patterns. The scientist may be interested in accessing data from weather stations, traffic sensors, rain meters, and road cameras, thus requiring multiple types of sensor systems, and multiple environments (e.g., spatial regions).

In order to utilize data collected from sensors or sensor networks, a user may own, install, and/or maintain the sensor or sensor network. Owning or maintaining a sensor network can be very costly. Alternately, a user may obtain access to, or information from, a sensor network owned or maintained by others. If a user relies on others to provide data, the user may not be able to control what data is collected, how it is collected, or how it is reported. Shared ownership and or operation of a sensor network may enable control by a user who is a partial owner and/or partial operator. Through sharing, the cost of collecting data may be lowered for any one of the users.

It may be difficult to determine the value or the market price of data generated from a sensor, or a particular sensor that is part of a sensor network, because the value or the price may depend on, for example, environmental conditions, the readings from other sensors in the network, competition for use, and the objectives, criterion and requirements of the user purchasing the sensor data.

Additional features of the invention provide for contracts between users having shared ownership of a sensor network, and/or for bidding or auctioning for shared sensor use. Additional aspects of the invention provide a model (e.g., a computer based mathematical model) of the environment (e.g., the environment of the sensor resources) in order to determine or form the appropriate valuation of sensor data or sensor use. For example, a provisioning system forms and provides the model.

Both pull and push mechanisms for pricing may be implemented. For example, in one embodiment, a push mechanism is used. In a push mechanism, a sensor sends a signal, termed a push signal, describing the sensors ability and access (e.g. accessibility or access requirements). A receiver receives the push signal, and negotiates pricing for sensor use. The push signal may describe for example, attributes of the sensor, price information, and other related information.

In an alternate embodiment, a pull mechanism is used, wherein a sensor receives a request signal (e.g., a request from a potential user or from a third-party service). The sensor responds to the request signal, for example, by describing its availability for use and pricing information. Finally, the price may be negotiated or agreed upon, for example, negotiated or agreed upon between the potential user or third party service and the sensor owner or sensor operator. The request signal received by the sensor may describe, for example, the requirements of the user (e.g., type of sensor data required, duration or time of use, or offered price for use). The originator of the request signal is teemed the receiver.

In embodiments utilizing push or pull mechanisms, the receiver may be a third-party service, a user, a group of users, or an entity associated with a user or group of users. The receiver may determine prices for the user and/or hold auctions.

Embodiments utilizing auctioning of sensor use may be supported by a computer system, for example, to automatically identify bids made, to record bids made, to determine winning bids, to determine pricing, and authorize sensor access by a user.

Figure 6:
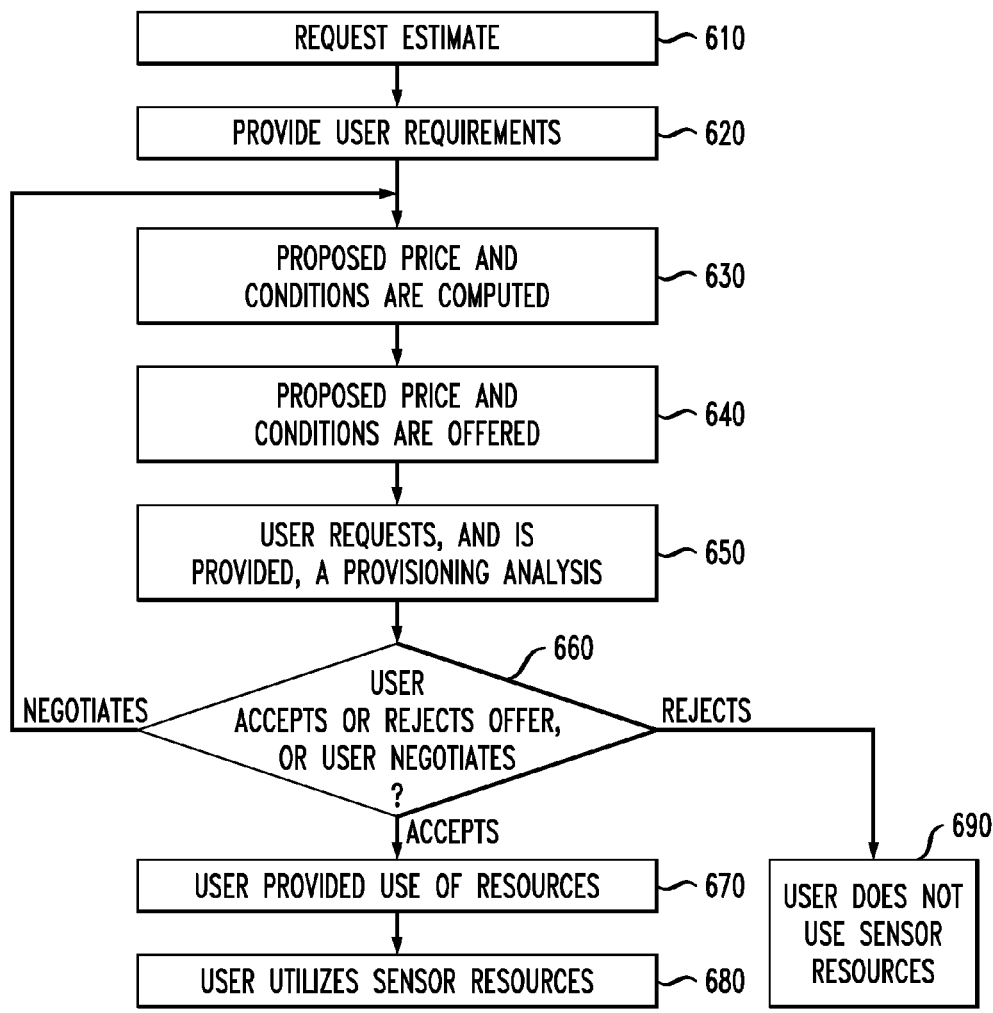
FIG. 6 shows a flow diagram of a method of obtaining sensor resources by a provisioning system, according to an embodiment of the invention.

FIG. 6 is a flow diagram of a method 600 of obtaining sensor resources by a provisioning system, according to an embodiment of the invention. Although the embodiment described is with respect to a single potential user, multiple potential users are also considered.

Method 600 may be applied to a single offer for sensor resources, or alternately, applied to multiple offers for one or more subsets of sensor resources. For example, a single offer may include sensor resources comprising ten sensors. Multiple offers may include ten offers, each offer for one sensor. (i.e., each of ten subsets of sensor resources includes one of the ten sensors). Furthermore, multiple offers are contemplated, wherein each of the multiple offers may include the same sensor resources, but the proposed conditions are different in each of the offers. Offers are contemplated that differ in both resources and conditions offered.

In the first step 610 of method 600, a potential user of sensor resources requests, by an estimate request module, the provisioning system to compute and provide an estimate of the expected value or price, and the variance of the expected value or price, of sensor resources to the potential user. A signal from the provisioning system to the potential user may describe the sensor attributes, price ranges, and related information.

In the second step 620, the potential user provides, by a criterion providing module, requirements or criterion of the potential user to the provisioning system, for example, input related to data collection objectives, constraints, and sensor use (e.g., prediction module and rule formation module related requirements) of the potential user. The potential user requirements or criterion may be, for example, a value or function (e.g., an equation) that represents willingness of the potential user to pay for sensor resources, and information regarding the level of sensor resources required (e.g., duration, rate of data collection, data collection algorithm or method that will be implemented with the sensor resources). For example, the potential user requirements or criterion may consider or result from rules formed according to methods of the invention, e.g., rules formed in the steps 340, 440 or 540.

The potential user may provide the requirements or criterion by a signal to the provisioning system.

In the third step 630, the provisioning system computes (i.e., forms), by a cost and condition computation module, a proposed cost(s) and condition(s) (e.g., duration, rate of data collection and method of use) under which sensor resources are proposed to be made available. A cost(s) and condition(s) may be customized for each potential user. The cost(s) and condition(s) can be specified for the sensor resources as a whole or for any subset of the sensor resources. For example, a user may bid, or the price and conditions specified, for sensor resources (e.g., a plurality of sensors) in one bundle, or a user may bid, or the price and conditions specified, for all or a portion of the sensor resources as one or more bundles (i.e., one or more portions of the sensor resources). A bundle may be, for example, a single sensor. In determining the proposed cost(s) and condition(s), the provisioning system considers one or more of: current and predicted future sensor resource availability, data collection objectives, constraints, prediction module, rule formation module, user and/or potential user demand and factors affecting demand. Constraints may be, for example, potential user, user or sensor resource provider constraints.

In the fourth step 640, the provisioning system communicates, by a cost and condition providing module, to the potential user the proposed price and proposed condition(s) under which sensor resources are offered (i.e., the offer).

In the fifth step 650, the potential user requests, by a provision analysis module, a provisioning analysis from the provisioning system, for example, the potential user is requesting the provisioning system to recommend if the potential user should accept or reject the offered price and/or conditions (i.e., the offer). Where the system may take as input and considers one or more of: data collection objectives, constraints, a predicted state of an environment (e.g., the predicted state of step 330 of method 300 or 700) and rules for data formation (e.g., the rules formed in step 340 of method 300 or 700) of the potential user. Additionally, the potential user may request the provisioning system to recommend an optimal set of price and/or condition(s) as a response (i.e., counter-proposal) to the quoted price and/or condition(s). The provisioning system provides the requested information to the potential user.

The provisioning analysis may include, for example, the impact of acceptance of an offer (i.e., an actual or an anticipated proposed price and/or conditions) on an estimate of a statistic or value of interest. The impact may include, for example, the accuracy of the estimate. The provisioning analysis may analyze multiple scenarios, for example, scenarios where different subsets of sensor resources are considered. Offers may be accepted or rejected considering the provisioning analysis.

The analysis of each scenario may consider a predicted state of the environment and may comprise the following steps: (i) select a subset of offers to reject and a subset of offers to accept, and (ii) compute, under conditions specified in the offer, a quality measure of a statistical estimate considering the subset of offers to accept and/or the subset of offers to reject.

Consider the following example. Ten offers, or anticipated offers, are considered and analyzed, one offer for the purchase or use of each of ten sensors. In selecting which one or more of the offers to accept the analysis considers the consequences accepting or rejecting each offer has on user objectives and requirements, for example, on the quality of one or more statistical estimates.

The selection for acceptance of one scenario over another scenario may consider, for example, a trade-off between a cost of purchasing, obtaining use of, or using the sensors, sensor resources or subset of sensor resources, and the quality of the statistical estimate resulting from use of the same.

The provisioning analysis may provide information, data or insight to be considered in further negotiations for the sensor resources or use thereof.

In the sixth step 660, the potential user accept or reject the offer, or the potential user offers to negotiate, with the owner or operator of the resources, price and/or conditions using the provisioning system as an interface. If negotiation occurs, any of the third step 630, the fourth step 640, the fifth step 650 and the sixth step 660 may be repeated. The sixth step is performed by an offer decision module.

In the seventh step 670, if the potential user accepts an offer, the potential user is provided use of the sensor resources under the conditions agreed on. For example, the potential user is provided the sensor resources using a resource provision module.

In the eighth step 680, the potential user who has accepted the offer may utilize the sensor resources according to the embodiments, principles or methods of the present invention (e.g., methods 200, 300, 400 and 500). For example, the eighth step 680 may be executed, at least in part, by a resource utilization module.

If the potential user rejects the offer without negotiation, the method 600 terminates without potential user access to the sensor resources at the ninth step 690.

In the method 600, a third-party service may be substituted for the potential user. The third party service may broker, purchase, rent or otherwise procure sensor resources and auction, offer or provide the sensor resources to the actual user or potential user of the sensor resources. The third party service may be a contractor, a potential contractor or a broker. A user, a potential user or the third party service may be considered and known as a contractor or potential contractor. A contractor being an entity that enters into a contract, in this case, a contract to procure and/or provide sensor resources. A potential contractor is an entity that is negotiating to acquire or provide contracted services or resources and may enter into a contact, in this case, a contract to procure and/or provide sensor resources. The third party service may be the receiver. Optionally, the receiver may be directly associated with a user or group of users.

The sensor or sensors in method 600 may be a single sensor or a set of sensors (e.g., a sensor network). For example, with a set of sensors, the signal sent out may represent some aggregate property of the sensors (e.g. a range of attributes, an average functionality, etc.) or information on each sensor.

The first step 610 and the second step 620 may be comprised in a of pull mechanism where the potential user initiates the provisioning process. A push mechanism may omit the first step 610 and the second step 620 and the provisioning system may initiate the provisioning process.

If desired, a framework for categorizing the different types of provisioning (e.g., provisioning contracts) can be provided by a third-party service. The provisioning or provisioning contracts may be between the "landlord" (i.e., owner or operator) and the "tenants" (i.e., user), between "co-owners" (i.e., co-owners and co-users) or between owners or operators who "barter" use of owned sensor resources for use of other sensor resources owned or operated by other owners or other operators. Additionally, the provisioning or provisioning contracts may be, for example, long-term or short-term, could be pay-as-you-go flat rate in a first-come-first-serve manner, could be auction-based, there could be tiered payment schemes.

Figure 7:
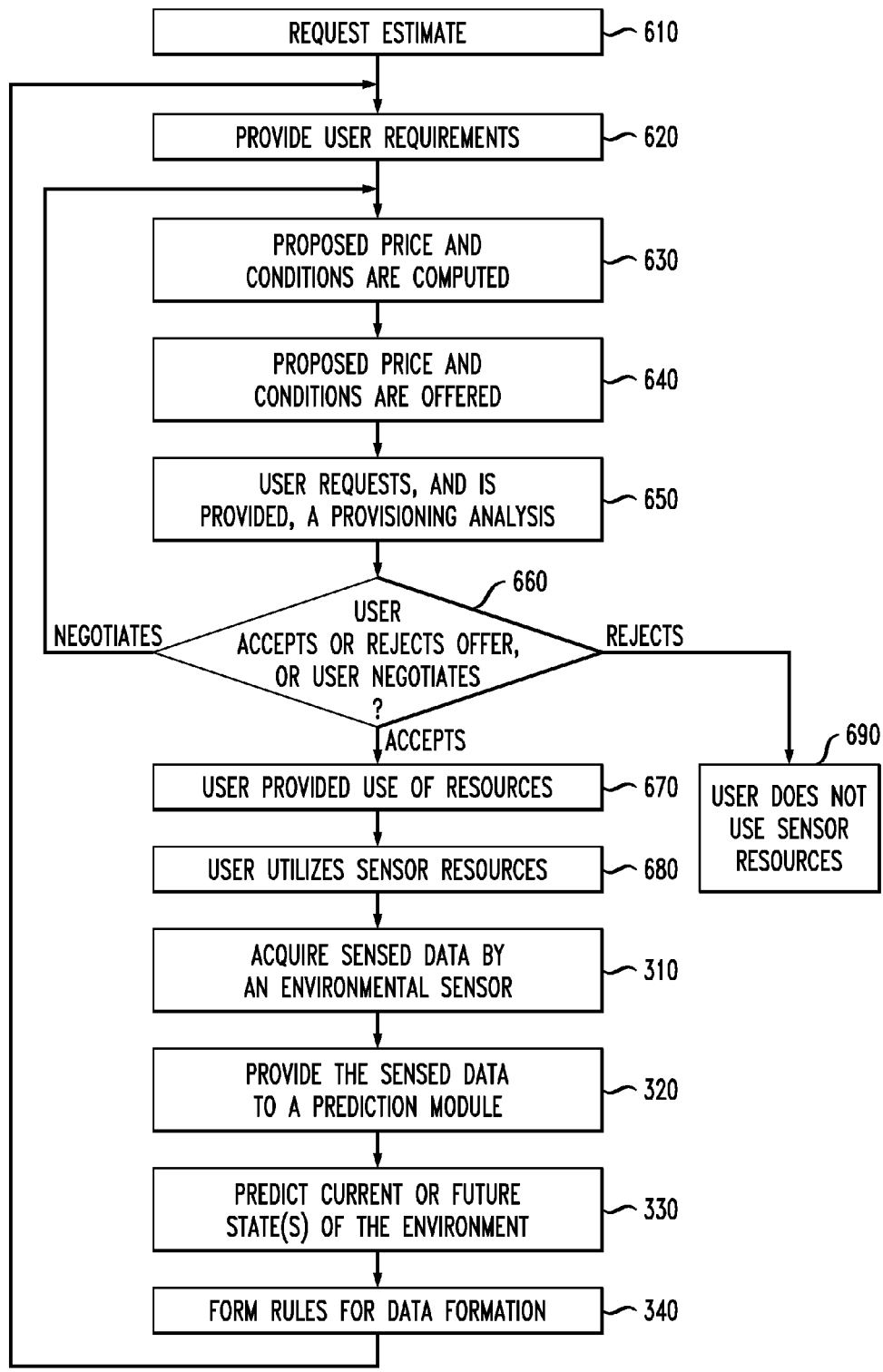
FIG. 7 illustrates a method of obtaining sensed data, according to an embodiment of the invention.

FIG. 7 illustrates a method 700 of obtaining sensed data, according to an embodiment of the invention. The method 700 may include obtaining sensor resources by a provisioning system and processing sensed data from the sensor resources. The steps of method 700 are steps similar to steps comprised within methods 600 and 300. The descriptions of the steps of method 700 are described in the descriptions of like labelled steps of methods 600 and 300.

The method 700 comprises feedback, in that the method first obtains at least limited use of sensor resources by one or more of steps 610, 620, 630, 640, 650, 660, 670 and 680, then proceed to form rules for data formation by executing one or more of steps 310, 320, 330 and 340. User requirements or criterion are then provided to the provisioning system in step 620. Method 700 then proceeds according to the flow diagram of FIG. 7.

One or more of the steps 310, 320, 330 and 340 may utilize the sensor resources obtained by the provisioning system. Thus, one or more of the steps 310, 320, 330 and 340 may be considered as part of the step 680, user utilizing the sensor resources.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 2-7, which are flow diagrams or flowchart of the methods 200, 300, 400, 500, 600 and 700, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Accordingly, techniques of the invention, for example as depicted in FIGS. 1-7, can also include, as described herein, providing a system, wherein the system includes distinct modules (e.g., software modules, hardware modules, or modules comprising both software and hardware). By way of example only, the modules may include: a data acquisition module, configured to acquire sensed data from at least one sensor; a sensed data providing module, configured to provide sensed data to at least one of a prediction module, a characteristic determining module and a condition determining module; a prediction module, configured to predict a present or future state; a rule formation module, configured to form rules for data formation; a prediction update determination module; configured to perform the fifth step 350 of method 300; a data formation module; configured to form data according to the rules for data formation; and an operation plan formation module, configured to perform the seventh step 370 of method 300. Additionally, also by way of example only, the software modules may further include modules to perform the steps of method 600, for example: an estimate request module, configured to perform the first step 610; a criterion providing module, configured to perform the second step 620; a cost and condition computation module, configured to perform the third step 630 of method 600; a cost and condition providing module, configured to perform the fourth step 640 of method 600; a provision analysis module, configured to perform the fifth step 650 of method 600; an offer decision module, configured to perform the sixth step 660 of method 600; a resource provision module, configured to perform the seventh step 670 of method 600; and a resource utilization module, configured to perform the eighth step 680 of method 600. Additional modules are a characteristic determining module, a condition determining module, and, configured to individually perform at least part of the second step 220 of method 200, and a method determining module, configured to perform, for example, the step 250 of method 200. The method determining module may, or may not, include the rule formation module. The modules may be configured, for example, to perform the steps of method 200, 300, 400, 500, 600 and 700 shown in FIGS. 2-7 respectively.

Figure 8:
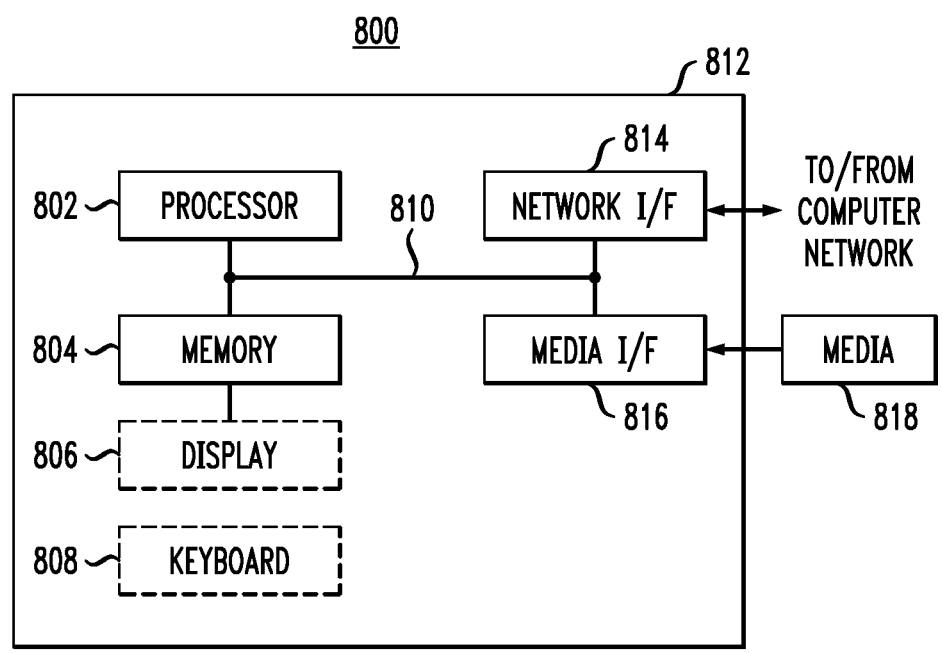
FIG. 8 depicts a computer system that may be useful in implementing one or more aspects and/or elements of the invention.

One or more embodiments can make use of software running on a general purpose computer or workstation. With reference to FIG. 8, such an implementation employs, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

A data processing system suitable for storing and/or executing program code can include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 808, display 806, pointing device, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, implemented on a processor device, of selecting a method of processing of sensed data, wherein the method of processing the sensed data is at least one of a transmission method, a data sampling method and a data compression method, the method comprising the steps of:
predicting a state of an environment;
obtaining at least one criterion related to use of sensor resources, the sensor resources comprising one or more data sensors, wherein the at least one criterion is based upon the predicted state;
transmitting the sensed data from the one or more data sensors to the processor device via at least one network, wherein the sensed data includes at least one signal;
receiving the sensed data from the one or more data sensors at the processor device;
providing an offer to a user for the use of the sensor resources, the offer comprising a proposed cost for the use of the sensor resources, wherein the offer is provided to the user (i) in response to a pull signal sent to the one or more data sensors over the at least one network from a device of the user, or (ii) as a push signal sent to the device of the user over the at least one network from the one or more data sensors;
determining, by processing the at least one signal, a characteristic of the sensed data;
selecting the method of processing the sensed data from a plurality of methods of processing the sensed data according to the determined characteristic and the predicted state, wherein the selected method is the transmission method, and the transmission method is based on the determined characteristic and the predicted state, and wherein the selecting comprises calculating a parameter indicating which transmission method to use;
automatically triggering a mode of operation of the one or more data sensors based on the selected transmission method;
processing the sensed data according to the selected transmission method; and
providing the processed sensed data to the device of the user via the at least one network;
wherein the selected transmission method is determinative of a degree to which the sensed data processed according to the selected transmission method is different from the sensed data prior to the processing according to the selected transmission method;
wherein the selected transmission method is at least based on a transmission mode of one or more other data sensors, and the transmission mode of the one or more other data sensors comprises at least one of a lossy transmission mode and a lossless transmission mode;
wherein the one or more other data sensors are scanned to determine their corresponding transmission modes, and which of the one or more other data sensors that are scanned is dynamically determined based on one or more conditions; and
wherein one or more of the steps are implemented on the processor device.

2. The method of claim 1, further comprising the step of: determining if the step of predicting a state of an environment should be repeated, wherein repeating the step of predicting a state of an environment provides for the selecting of the method of processing of the sensed data to adapt processing to new sensed data.

3. The method of claim 1, further comprising the step of: forming an operational plan according to the sensed data.

4. The method of claim 1, further comprising the step of: accepting a request for an estimate for the use of the sensor resources.

5. The method of claim 1 further comprising the step of: forming a model of an environment of the sensor resources.

6. The method of claim 1, further comprising determining at least one proposed condition for the use of the sensor resources, and wherein the offer further comprises the at least one proposed condition.

7. The method of claim 1, further comprising the step of: providing the sensor resources to the user according to the offer.

8. The method of claim 1, further comprising the steps of: accepting a request, by a potential contractor, to provide information regarding acceptance or rejection of the offer, wherein, in response to the request to provide information regarding acceptance or rejection of the offer, the method considers at least one of: a data collection objective, a constraint, the predicted state of an environment, and one or more rules used to select the method of processing the sensed data; and
providing the information regarding the acceptance or the rejection of the offer to the potential contractor.

9. The method of claim 1, further comprising the step of: receiving at least one of: an acceptance of the offer, a rejection of the offer, and a proposal to negotiate the offer.

10. The method of claim 1, wherein the at least one criterion comprises at least one of: (i) current sensor resource availability, (ii) predicted future sensor resource availability, (iii) data collection objectives, (iv) a constraint, (v) the predicted state of an environment, (vi) one or more rules used to select the method of processing the sensed data, and (vii) user demand.

11. The method of claim 1, wherein the step of obtaining at least one criterion comprises obtaining the at least one criterion from a potential contractor, wherein the potential contractor is at least one of: a potential user, a third-party that procures the sensor resources and provides the sensor resources to a user, a third-party that brokers the use of the sensor resources, and a third-party that auctions the use of the sensor resources.

12. The method of claim 1, wherein the sensed data indicates at least one aspect of water management.

13. The method of claim 12, wherein the at least one aspect of water management comprises at least one of: (i) water level, (ii) water volume, (iii) water flow rate, (iv) water contamination, (v) concentration of a chemical, (vi) a level of turbidity, (vii) eutrophication, and (viii) a population.

14. The method of claim 12, wherein water management comprises at least one of: (i) flood management, (ii) drought management, (iii) water distribution management, (iv) waste water management, (v) salt water management, and (vi) environmental management.

15. The method of claim 1, wherein the selected method of processing further comprises at least one of: (i) a method of lossy data compression, (ii) a method of lossless data compression, and (iii) a method of data aggregation.

16. The method of claim 1, wherein the selected transmission method comprises at least one of a method of lossy transmission of data, and a method of lossless transmission of data.

17. The method of claim 1, wherein the characteristic of the sensed data comprises at least one of: (i) a weather condition, (ii) a dangerous environment, (iii) a level of turbidity, and (iv) eutrophication.

18. The method of claim 1, wherein the state of the environment comprises at least one of: (i) a state indicated by a parameter monitored by the one or more data sensors, (ii) a state indicated by one or more other data sensors, (iii) a current state, (iv) a future state, (v) an environmental state, (vi) a state associated with water management, (vii) a state of a physical environment, (viii) a state of a social environment, (ix) a state of an economic environment, (x) a state of weather, (xi) a cost for data sensor use, (xii) a water price, (xiii) an energy price, and (xiv) a predicted number of people that may be affected by an action.

19. The method of claim 1, wherein the selecting of the method of processing is according to at least one of: (i) one or more objectives for the use of the sensed data, (ii) one or more constraints associated with the sensed data, (iii) time of day, (iv) a chronological measure, (v) a characteristic of one or more other data sensors, (vi) a water price, and (vii) an energy price.

20. The method of claim 19, wherein the selecting of the method of processing is according to the one or more objectives for the use of the sensed data and the one or more objectives for the use of the sensed data comprises at least one of: (i) minimizing an error associated with the use of the sensed data, (ii) minimize an error associated with a statistical estimate, (iii) minimize a risk, and (iv) minimize a cost, and wherein the one or more constraints associated with the sensed data comprise at least one of: (i) a time constraint, (ii) a bandwidth limitation, (iii) an accuracy requirement of the sensed data, and (iv) an accuracy requirements of a statistical estimates resulting from the sensed data.

21. The method of claim 1, wherein the at least one criterion comprises at least one of: an objective, a constraint, a cost criterion, a sensor resource criterion, a sensor use criterion, an accuracy criterion of the sensed data, and an accuracy criterion of a statistical estimate resulting from the sensed data.

22. The method of claim 1, wherein the step of selecting a method of processing the sensed data comprises:
forming one or more rules to determine the method of the processing of the sensed data, the one or more rules formed according to the predicted state.

23. A system of selecting a method of processing of sensed data, wherein the method of processing the sensed data is at least one of a transmission method, a data sampling method and a data compression method, the system comprising:
a prediction module, configured to predict a state of an environment;
a criterion providing module, configured to obtain at least one criterion related to use of sensor resources, the sensor resources comprising one or more data sensors, wherein the at least one criterion is based upon the predicted state;
a data acquisition module, configured to receive the sensed data from the one or more data sensors, wherein the sensed data includes at least one signal, and wherein the sensed data is transmitted from the one or more data sensors to the data acquisition module via at least one network;
a cost and condition providing module configured to provide an offer to a user for the use of the sensor resources, the offer comprising a proposed cost for the use of the sensor resources, wherein the offer is provided to the user (i) in response to a pull signal sent to the one or more data sensors over the at least one network from a device of the user, or (ii) as a push signal sent to the device of the user over the at least one network from the one or more data sensors
a characteristic determining module, configured to determine, by processing the at least one signal, a characteristic of the sensed data;
a method determining module, configured to select the method of processing the sensed data from a plurality of methods of processing the sensed data according to the determined characteristic and the predicted state, wherein the selected method is the transmission method, and the transmission method is based on the determined characteristic and the predicted state, and wherein the selecting comprises calculating a parameter indicating which transmission method to use; and
a data formation module, configured to process the sensed data according to the selected transmission method;
wherein a mode of operation of the one or more data sensors is automatically triggered based on the selected transmission method;
wherein the processed sensed data is provided to the device of the user via the at least one network;
wherein the selected transmission method is determinative of a degree to which the sensed data processed according to the selected transmission method is different from the sensed data prior to the processing according to the selected transmission method;
wherein the selected transmission method is at least based on a transmission mode of one or more other data sensors, and the transmission mode of the one or more other data sensors comprises at least one of a lossy transmission mode and a lossless transmission mode;
wherein the one or more other data sensors are scanned to determine their corresponding transmission modes, and which of the one or more other data sensors that are scanned is dynamically determined based on one or more conditions; and
wherein the predicting of the state of the environment, the obtaining of the at least one criterion, the receiving of the sensed data, the providing of the offer to the user, the determining of the characteristic of the sensed data, the selecting of the method of processing the sensed data, and the processing the sensed data are implemented on a processor device.

24. Apparatus for selecting a method of processing of sensed data, wherein the method of processing the sensed data is at least one of a transmission method, a data sampling method and a data compression method, the apparatus comprising:
a memory; and
a processor coupled to the memory, operative to:
predict a state of an environment;
obtain at least one criterion related to use of sensor resources, the sensor resources comprising one or more data sensors, wherein the at least one criterion is based upon the predicted state;
wherein the sensed data is transmitted from the one or more data sensors to the processor via at least one network, wherein the sensed data includes at least one signal;
receive the sensed data from the one or more data sensors;

provide an offer to a user for the use of the sensor resources, the offer comprising a proposed cost for the use of the sensor resources, wherein the offer is provided to the user (i) in response to a pull signal sent to the one or more data sensors over the at least one network from a device of the user, or (ii) as a push signal sent to the device of the user over the at least one network from the one or more data sensors;

determine, by processing the at least one signal, a characteristic of the sensed data;

select the method of processing the sensed data from a plurality of methods of processing the sensed data according to the determined characteristic and the predicted state, wherein the selected method is the transmission method, and the transmission method is based on the determined characteristic and the predicted state, and wherein the selecting comprises calculating a parameter indicating which transmission method to use;

automatically trigger a mode of operation of the one or more data sensors based on the selected transmission method;

process the sensed data according to the selected transmission method; and provide the processed sensed data to the device of the user via the at least one network;

wherein the selected transmission method is determinative of a degree to which the sensed data processed according to the selected transmission method is different from the sensed data prior to the processing according to the selected transmission method;

wherein the selected transmission method is at least based on a transmission mode of one or more other data sensors, and the transmission mode of the one or more other data sensors comprises at least one of a lossy transmission mode and a lossless transmission mode; and wherein the one or more other data sensors are scanned to determine their corresponding transmission modes, and which of the one or more other data sensors that are scanned is dynamically determined based on one or more conditions.

25. A computer program product for selecting a method of processing of sensed data, wherein the method of processing the sensed data is at least one of a transmission method, a data sampling method and a data compression method, the computer program product comprising a non-transitory computer readable storage medium having computer readable program code embodied therewith, the computer readable program code comprising computer readable program code configured to perform the steps of:

predicting a state of an environment;

obtaining at least one criterion related to use of sensor resources, the sensor resources comprising one or more data sensors, wherein the at least one criterion is based upon the predicted state, and wherein the sensed data is transmitted from the one or more data sensors to a processor device via at least one network, wherein the sensed data includes at least one signal;

receiving the sensed data from the one or more data sensors at the processor device;

providing an offer to a user for the use of the sensor resources, the offer comprising a proposed cost for the use of the sensor resources, wherein the offer is provided to the user (i) in response to a pull signal sent to the one or more data sensors over the at least one network from a device of the user, or (ii) as a push signal sent to the device of the user over the at least one network from the one or more data sensors;

determining a characteristic of the sensed data;

selecting the method of processing the sensed data from a plurality of methods of processing the sensed data according to the determined characteristic and the predicted state, wherein the selected method is the transmission method, and the transmission method is based on the determined characteristic and the predicted state, and wherein the selecting comprises calculating a parameter indicating which transmission method to use;

automatically triggering a mode of operation of the one or more data sensors based on the selected transmission method;

processing the sensed data according to the selected transmission method; and providing the processed sensed data to the device of the user via the at least one network;

wherein the selected transmission method is determinative of a degree to which the sensed data processed according to the selected transmission method is different from the sensed data prior to the processing according to the selected transmission method;

wherein the selected transmission method is at least based on a transmission mode of one or more other data sensors, and the transmission mode of the one or more other data sensors comprises at least one of a lossy transmission mode and a lossless transmission mode;

wherein the one or more other data sensors are scanned to determine their corresponding transmission modes, and which of the one or more other data sensors that are scanned is dynamically determined based on one or more conditions; and wherein one or more of the steps are implemented on the processor device.

26. The method of claim 1, wherein an increasing number of the one or more other data sensors are progressively scanned to make a plurality of assessments of transmission mode as a function of respective groups of the one or more other data sensors.

* * * * *